(12) United States Patent
Murakami et al.

(10) Patent No.: US 6,919,665 B2
(45) Date of Patent: Jul. 19, 2005

(54) STATOR CORE, AN ELECTRIC MOTOR IN WHICH IT IS UTILIZED, AND METHOD OF MANUFACTURING A STATOR CORE

(75) Inventors: Takuya Murakami, Obama (JP); Toshiaki Murakami, Nagoya (JP)

(73) Assignee: Nidec Shibaura Corporation, Obama (JP)

( * ) Notice: Subject to any disclaimer, the term of this patent is extended or adjusted under 35 U.S.C. 154(b) by 0 days.

(21) Appl. No.: 10/605,417

(22) Filed: Sep. 30, 2003

(65) Prior Publication Data

US 2005/0067912 A1 Mar. 31, 2005

(51) Int. Cl.$^7$ .............................. H02K 1/06; H02K 1/12
(52) U.S. Cl. ...................................... 310/216
(58) Field of Search ................................ 310/216, 217, 310/254, 258

(56) References Cited

U.S. PATENT DOCUMENTS

| | | | | |
|---|---|---|---|---|
| 4,365,180 A | * | 12/1982 | Licata et al. ................. | 310/216 |
| 5,729,072 A | * | 3/1998 | Hirano et al. ............... | 310/258 |
| 6,147,431 A | | 11/2000 | Asao et al. | |
| 6,226,856 B1 | | 5/2001 | Kazama et al. | |
| 6,369,480 B1 | | 4/2002 | Nishiyama et al. | |
| 6,507,991 B1 | * | 1/2003 | Ozawa et al. ................. | 29/596 |
| 6,634,080 B2 | * | 10/2003 | Bareis et al. ................. | 29/596 |
| 6,700,284 B2 | * | 3/2004 | Williams et al. ............ | 310/216 |

* cited by examiner

Primary Examiner—Tran Nguyen
(74) Attorney, Agent, or Firm—Shinjyu Global IP

(57) ABSTRACT

In a stator core is formed by laminated strip-shaped straight cores including a plurality of teeth portions, bent portions being provided with V-shaped notches, which define V-shaped gaps opened to one direction and interposing between each of the teeth portions, the straight cores being formed into an annular configuration by bending the bent portions in a direction so as to close the V-shaped notches and circular holes being provided at the bent portions so as to form a series of gaps between each of the teeth portions. The straight cores further include deformation preventing portions formed on the bent portions by cutting off a part of a pair of oblique lines defining the V-shaped notches toward the circular holes so as to expand the gaps of the V-shaped notches and the circular holes for preventing the bent portions from deforming by stress of bending process.

5 Claims, 12 Drawing Sheets

(a)

(b)

STATOR CORE, AN ELECTRIC MOTOR IN WHICH IT IS UTILIZED, AND METHOD OF MANUFACTURING A STATOR CORE

BACKGROUND OF INVENTION

1. Technical Field

The present invention relates to a stator core which can be used in an electric motor such as a brushless DC motor and a method of manufacturing thereof.

2. Description of the Related Art

A stator core is generally formed by bending an elongate and straight strip made of thin silicon steel into an annular shape, and by making a lamination with a plurality of the bent strips. In this specification, such straight strip is referred to as "straight core". Each straight core is made by punching laminated wide and thin silicon steel sheets. The straight core includes a plurality of teeth portions, each of which has a T-shape, and a plurality of core back portions, each of which connects two T-shaped teeth portions next to each other.

To explain a conventional straight core, a partial plan view of an unbent straight core is shown in FIG. 10. The conventional straight core 100 is made by punching laminated silicon steel sheets and includes a plurality of teeth portions 111 and a plurality of core back portions. V-shaped notches 113, which define V-shaped gaps opened to one direction, are formed between the teeth portions 111 and each of the teeth portions 111 are connected with each other via thin portions 117 which are integrally formed with the core back portion so as to have narrower width than the core back portion by the V-shaped notches 113. These thin portions 117 and V-shaped notches 113 form bent portions 112.

The stator core, which is used as a laminated stator core of an electric motor, is manufactured by bending the straight core 100 at the bent portions 112 in a direction so as to close an opening of the V-shaped notches 113. And then connecting both end portions of each of the straight core, the straight cores are formed into annular configuration.

In the conventional straight core 100, as shown in FIG. 11 depicting an enlarged view of section B of FIG. 10, circular hole 114 is provided at the bent portion 112 in a manner that the circular hole 114 is connected to a tip portion of the V-shaped notch 113 (indicated by chain line in FIG. 11) so as to form a series of gaps between each of the teeth portions 111 (in FIG. 11, the tip of the V-shaped notches 113 is positioned on a circumference of the circular hole 114) so as to prevent thin portion 117 of bent portion 112 having narrower width from being cracked to make a uniform flexure deformation during bending process and arc shaped fitting portions 115 and 115' are also provided with the bent portion 112 so as to prevent bounded teeth portion 111 from displacing with each other.

In the aforementioned straight core 100, a pair of projecting portions 116 and 116' are formed at the intersecting locations where the circumference of the circular hole 114 intersects a pair of oblique lines of the V-shaped notch 113 in a manner that the projecting portions project to oppose with each other. And a narrower gap part 118 is formed between the projecting portions 116 and 116'. In the production process of the straight core, the punching force of a cutting die for punching out the straight core 100 from laminated silicon steel sheets is partially abated at the projecting portions 116 and 116'. Therefore, the depreciation and repair costs of the cutting dies and the maintenance of manufacturing facilities are increased, because partial abrasion loss of the cutting dies become larger and duration of the cutting dies become shorter. Which makes the production cost of the core increase.

However, if the diameter of the circular hole 114 is enlarged so as to equalize the punching force acting on the laminated silicon steel sheets, cross-sectional area of the bent portions 112, which contributes to forming magnetic circuit between bounded teeth portions 111, becomes small. As the result, magnetic reluctance of the bent portions 112 is increased and magnetic properties thereof are deteriorated. And the diameter of the stator core must necessarily be at least a given size for decreasing the magnetic reluctance of the bent portions 112. This requirement stands in the way of making the electric motor be smaller.

In addition, as shown in FIGS. 12(a) and 12(b), because the tip portions of the projecting portions 116 and 116' are located at the both sides of the narrower gap parts 118, during the bending process of the straight core 100 the contact point of the tip portions act as a fulcrum of the bent portions 112, as a result a deformation stress is regionally concentrated around the projecting portions 116 and 116' and the stress concentration deforms the steel sheets in a large way and in a broad area around the bent portion 112. The large deformation increases iron loss of the bent portion 112 and deteriorates the magnetic property thereof.

Further, the accuracy of the configuration of the annular stator core (i.e. a roundness, a concentricity or a coaxality of it) is deteriorated by the deformation of the bent portions 112 or a dispersion of an occurrence of the deformation during the bending process. As a result an increased-noise and a vibration of the electric motor are made.

An object of the present invention is to reduce the production cost of a stator core by increasing the life time of a cutting die for manufacturing stator cores.

Another object of the present invention is to maintain magnetic properties and improve accuracy of work of a stator core by preventing a straight core from deforming during bending process.

And another object of the present invention is to reduce the production cost of an electric motor and to minimize a noise and a vibration during the electric motor operation.

SUMMARY OF INVENTION

In one aspect of the present invention, a stator core reducing the production cost of a stator core by increasing the life time of a cutting die for manufacturing stator cores is provided. In one embodiment, the stator core is formed by laminated straight cores including a plurality of teeth portions, bent portions being provided with V-shaped notches, which define V-shaped gaps opened to one direction and interposing between each of the teeth portions. The straight cores are formed into an annular configuration by bending the bent portions in a direction so as to close the V-shaped notches. Circular holes are provided at the bent portions so as to form a series of gaps between each of the teeth portions. The straight cores further include deformation preventing portions formed on the bent portions by cutting off a part of a pair of oblique lines defining the V-shaped notches toward the circular holes so as to expand the gaps of the V-shaped notches and the circular holes for preventing the bent portions from deforming by stress of bending process.

Also, another aspect of a stator core according to the present invention, the stator core is formed by strip-shaped straight cores including a plurality of teeth portions, bent portions being provided with V-shaped notches and interposing between each of the teeth portions and segment core elements having plural independent segment cores formed by cutting off each of teeth portions. The stator core is made by a steps of, laminating the straight cores and the segment cores, and bending the bent portions in a direction so as to close the V-shaped notches to form annular stator core.

Also, one aspect of an electric motor according to the present invention, the electric motor having a stator which can be reduced the production cost of the electric motor and minimized a noise and a vibration during the electric motor operation. In one embodiment, the electric motor generally having a stator and a rotor including a magnetic material facing to the stator core in radial direction. The stator includes a stator core formed by strip-shaped straight cores having a plurality of teeth portions, bent portions being provided with V-shaped notches and interposing between each of the teeth portions and bending the bent portions in a direction so as to close the V-shaped notches to form annular stator core, circular holes being provided in the bent portions in a manner that the circular holes are continuously formed with tip portions of each of the V-shaped notches. Deformation preventing portions are formed on the bent portions by cutting off a part of a pair of oblique lines defining the V-shaped notches toward the circular holes so as to expand the gaps of the V-shaped notches and the circular holes for preventing the bent portions from deforming by stress of bending process.

Also, another aspect of an electric motor according to the present invention, the electric motor has a stator and a rotor including a magnetic material facing to the stator core in radial direction. The stator includes a stator core formed by strip-shaped straight cores having a plurality of teeth portions, bent portions being provided with V-shaped notches and interposing between each of the teeth portions and bending the bent portions in a direction so as to close the V-shaped notches to form annular stator core, circular holes being provided in the bent portions in a manner that the circular holes are continuously formed with tip portions of each of the V-shaped notches. Deformation preventing portions are formed on the bent portions by cutting off a part of a pair of oblique lines defining the V-shaped notches toward the circular holes so as to expand the gaps of the V-shaped notches and the circular holes for preventing the bent portions from deforming by stress of bending process and segment core elements having plural independent segment cores formed by cutting off each of teeth portions are alternatively laminated with the straight cores so as to form a plurality of slits within the stator core.

Also, one aspect of a method of manufacture for a stator core includes steps of: punching laminated silicon steel sheets to form straight cores including a plurality of teeth portions connected with each other via bent portions having V-shaped notches and circular holes continuously formed with tip portions of each of the V-shaped notches and deformation preventing portions formed on the bent portions by cutting off a part of a pair of oblique lines defining the V-shaped notches toward the circular holes so as to expand the gaps of the V-shaped notches and the circular holes; and bending the bent portions in a direction so as to close the V-shaped notches and connecting both end portions of the straight core so as to form annular stator core. In such manufacture process, the deformation preventing portions prevent the bent portions from deforming by stress of bending process.

Also, another aspect of a method of manufacture for a stator core includes steps of: punching laminated silicon steel sheets to form the straight cores including a plurality of teeth portions connected with each other via bent portions having V-shaped notches and circular holes continuously formed with tip portions of each of the V-shaped notches and deformation preventing portions formed on the bent portions by cutting off a part of a pair of oblique lines defining the V-shaped notches toward the circular holes so as to expand the gaps of the V-shaped notches and the circular holes; cutting off some of the straight cores and forming the segment core elements having plural independent segment cores; laminating the straight cores and the segment core elements alternatively so as to form a plurality of slits within the stator core; and bending the bent portions in a direction so as to close the V-shaped notches and connecting both end portions of the straight core so as to form annular stator core.

From the following detailed description in conjunction with the accompanying drawings, the foregoing and other objects, features, aspects and advantages of the present invention will become readily apparent to those skilled in the art.

BRIEF DESCRIPTION OF DRAWINGS

For better understanding of the present invention, reference is made of a detailed description to be read in conjunction with the accompanying drawings, in which:

FIGS. 7(a) and 7(b) are circular charts showing roundness of stator core, in which FIG. 7(a) shows roundness of stator core of the present invention and FIG. 7(b) shows roundness of conventional stator core;

DETAILED DESCRIPTION

First Embodiment

Referring now to FIGS. 1 through 7, a preferred first embodiment of the present invention will be described in detail.

Figure 1:
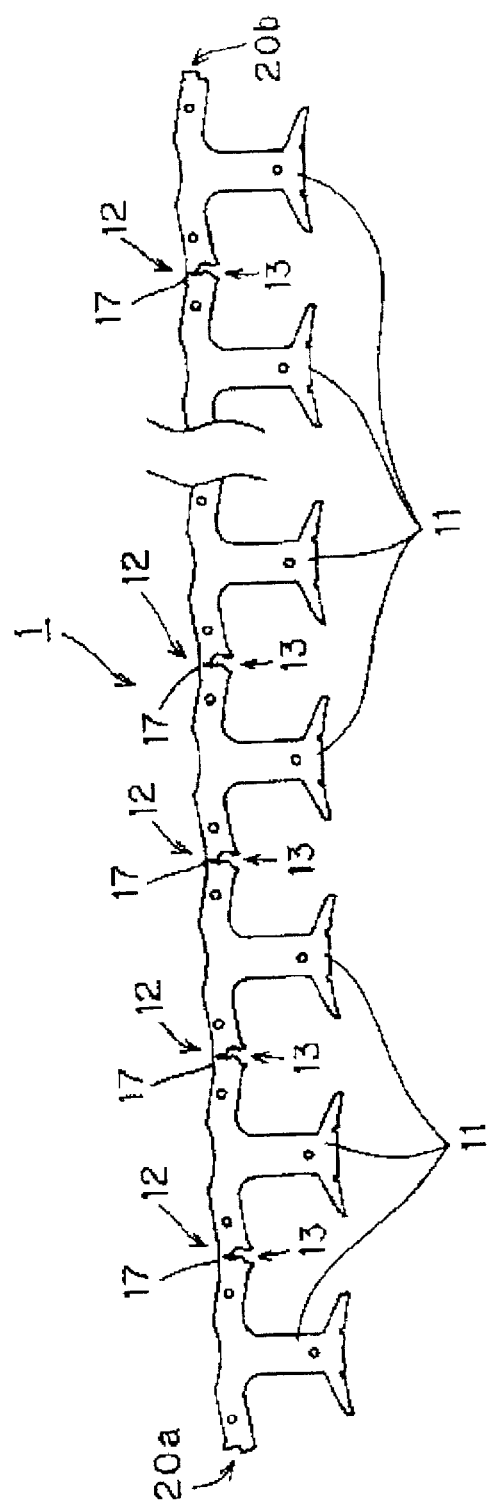
FIG. 1 is a plan view schematically illustrating the configurational outline of a straight core in first embodiment of the present invention.
Figure 2:
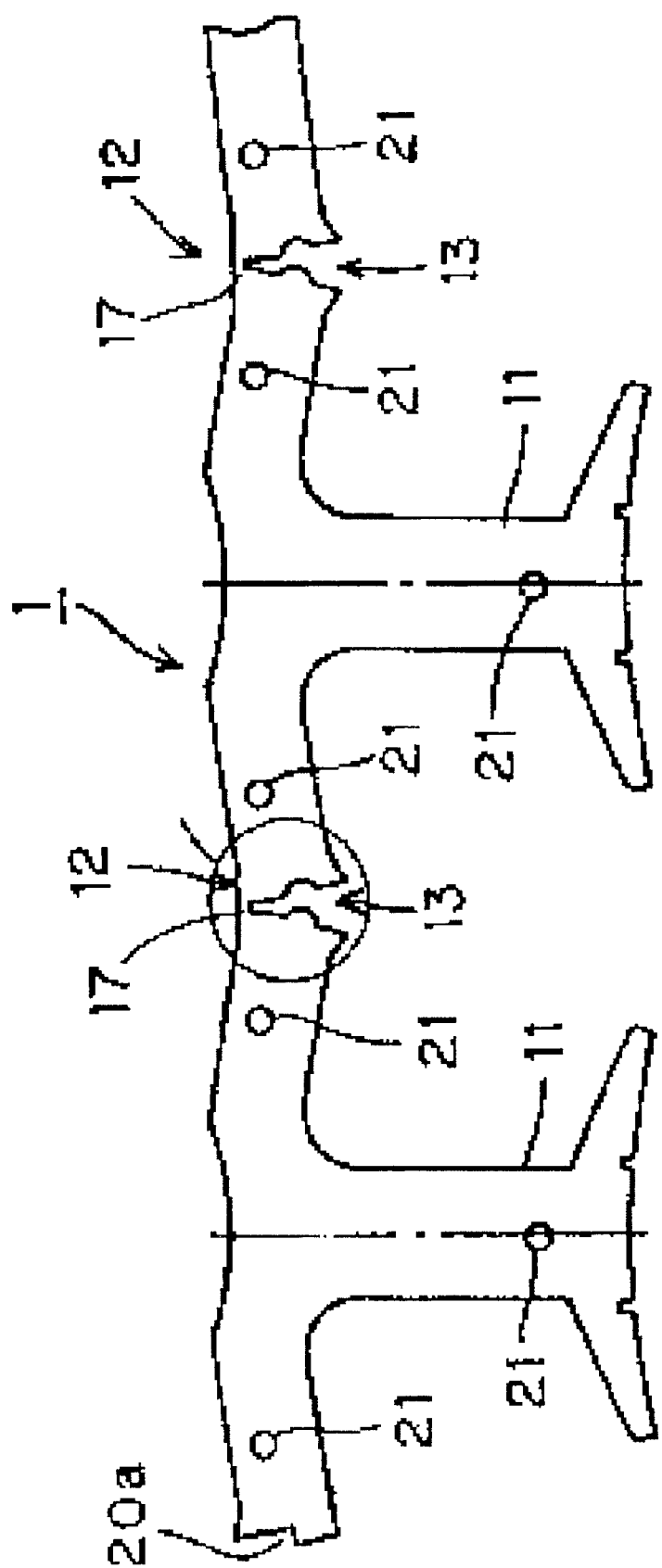
FIG. 2 is an enlarged fragmentary sectional view schematically illustrating the configurational outline of the straight core depicted in FIG. 1.

FIG. 1 is a plan view showing a straight core 1 forming a stator core of an electric motor. FIG. 2 is an enlarge fragmentary sectional view showing the straight core 1 depicted in FIG. 1, and FIG. 3 is an enlarge fragmentary schematic view showing a V-shaped notch being provided at a bent portion (section A of FIG. 2).

A straight core 1 shown in FIGS. 1 and 2 is made by punching laminated silicon steel sheets and manufactured by a pressing machine using cutting dies. The straight core 1 includes a plurality of T-shaped teeth portions 11 having a core back portion and a tooth extending from the core back portion. V-shaped notches 13, which define V-shaped gaps opened to one direction, are formed between the teeth portions 11 and each of the teeth portions 11 are connected with each other via thin portions 17 which are integrally formed with the core back portion so as to have narrower width than the core back portion by the V-shaped notches 13. These thin portions 17 and V-shaped notches 13 form bent portions 12. The straight core 1 further includes holes 21 for caulking and fixing the straight core 1 and connecting portions 20a and 20b are formed on both end portions of the straight core 1 so as to annularly configurate the straight core 1 by bending the straight core 1 at the bent portions 12 and connecting the connecting portions 20a and 20b.

Figure 3:
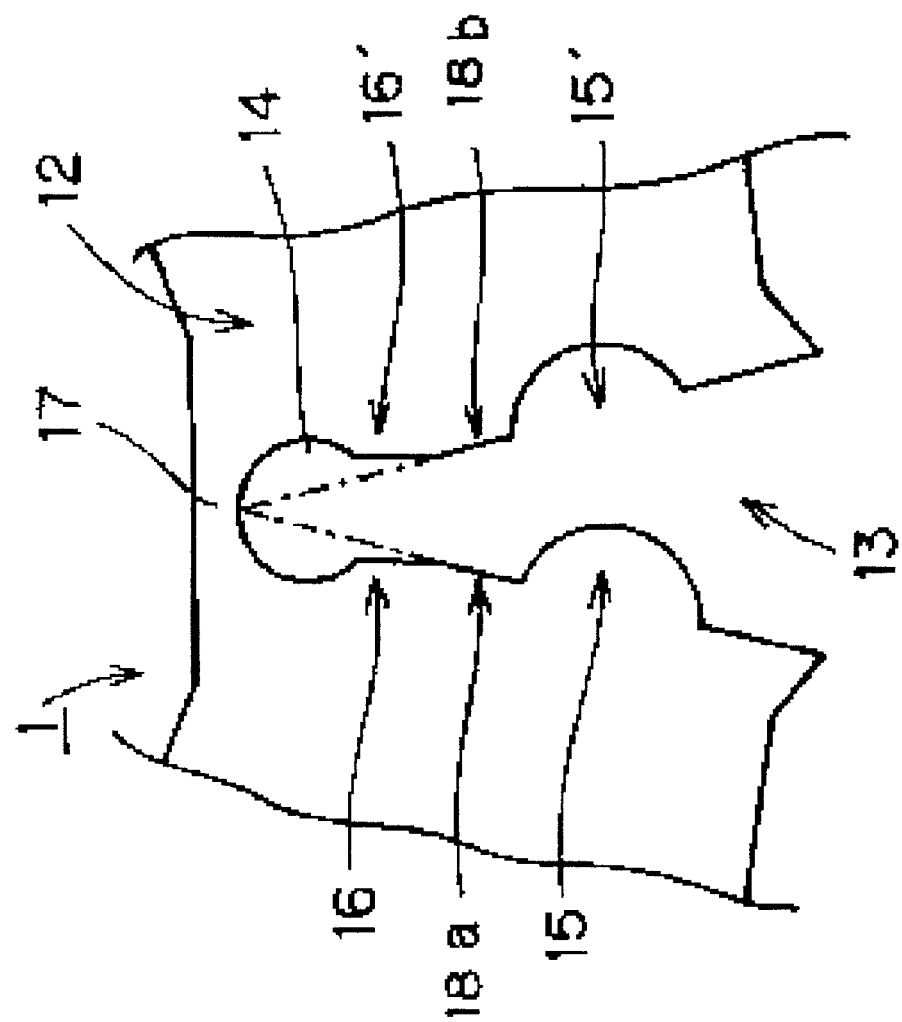
FIG. 3 is an enlarged fragmentary schematic view illustrating the configurational outline of a V-shaped notch of the straight core depicted in FIG. 1.
Figure 4:
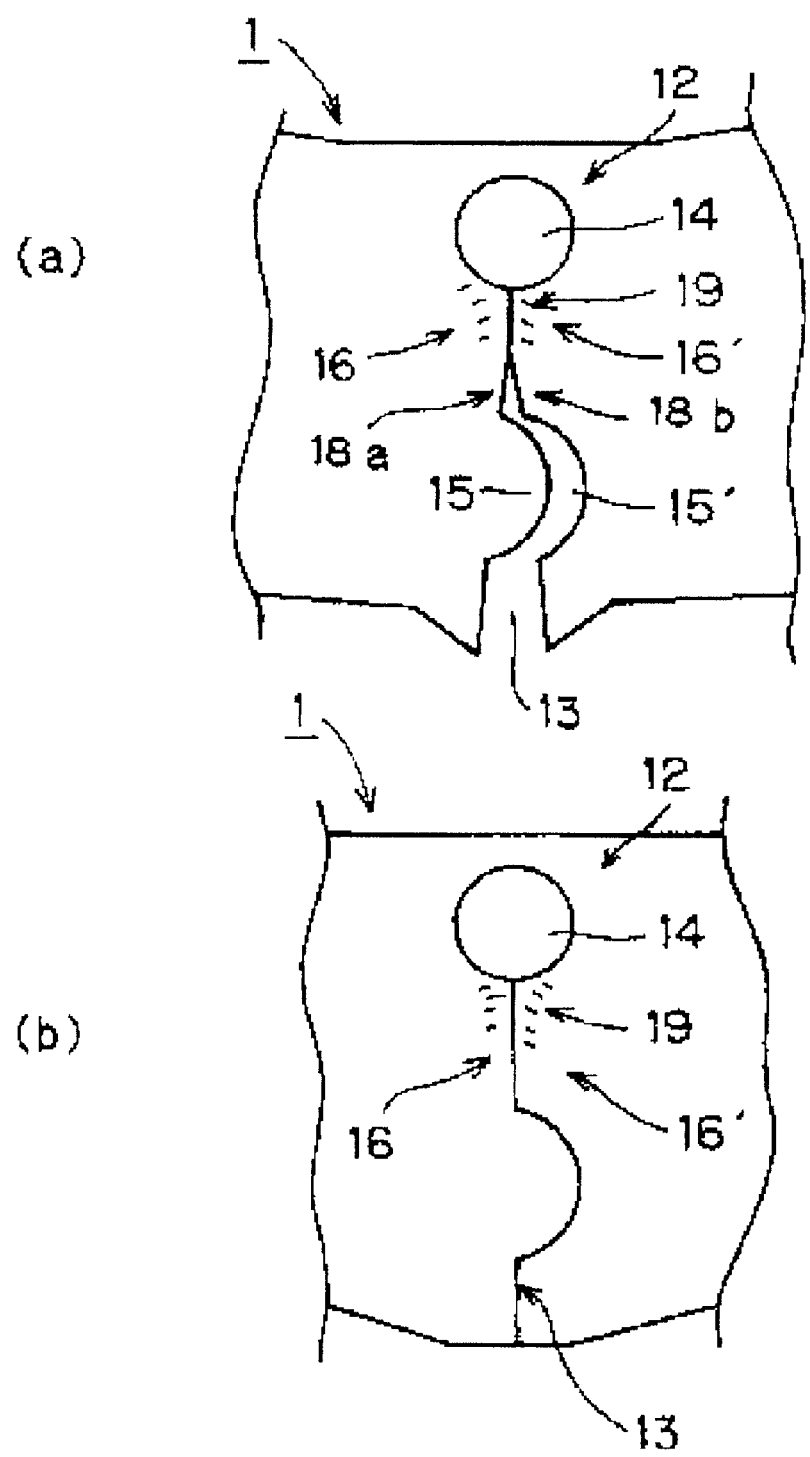
FIG. 4 is an explanation view of the V-shaped notch depicted in FIG. 1 during bending process.

As shown in FIG. 3 depicting an enlarged view of section A of FIG. 2, circular holes 14 are provided at the bent portions 12 in a manner that the circular holes 14 are connected to a tip portion of each of the V-shaped notches 13 (indicated by chain line in FIG. 3) so as to form a series of gaps between each of the teeth portions 11 so as to prevent thin portions 17 having narrower width from being cracked to make a uniform flexure deformation during bending process and arc shaped fitting portions 15 and 15' are also formed on a pair of oblique lines 18a and 18b defining the V-shaped notches 13 so as to prevent bounded teeth portions 11 from displacing with each other.

Deformation preventing portions 16 and 16' are formed on the bent portions 12 by cutting off a part of the pair of oblique lines 18a and 18b of the V-shaped notches 13 from a portion between the fitting portions 15 and 15' and a tip portion of the V-shaped notches 13 toward the circular holes 14 so as to expand the gap of the V-shaped notches 13 and the circular holes 14 for preventing the bent portions 12 from deforming by stress of the bending process. The deformation preventing portions 16 and 16' of the bent portions 12 eliminate conventional narrower gap portion 118 formed by a pair of projecting portions 116 and 116' and lineally extend from the oblique lines 18a and 18b toward the circular holes 14.

The deformation preventing portions 16 and 16' having substantially straight configuration connecting between the V-shaped notches 13 and the circular holes 14 of the bent portions 12. As the result, punching force of cutting dies for punching out the straight core 1 can be equalized on whole of cutting part of the cutting dies without partial abatement at the constriction portion as conventional manner. Consequently, the punching force of the cutting dies can be increased and partial abrasion loss of the cutting dies can be prevented.

Therefore, depreciation and repair costs of the cutting dies and maintenance of manufacturing facilities can be decreased and efficiency of punching process also can be enhanced. Thus, a production cost does not increase.

In addition, because of improvement of configuration of the bent portions 12, there is no need to enlarge diameter of the circular hole 14 for increasing the punching force of the cutting dies and cross-sectional area of magnetic circuit between bounded teeth portions 11 can be maintained and also deterioration of magnetic properties of the bent portions 12 can be prevented. And, there is no need to enlarge size of the stator core for decreasing the magnetic reluctance of the bent portions 12. Thus, size of a brushless DC motor can be maintained.

As shown in FIGS. 4(a) and 4(b), because the deformation preventing portions 16 and 16' of the bent portions 12 act as fulcrum in the bending process and the teeth portions 11 are linearly in contact with each other, deformation stress is dispersed in the bent portions 12 and deformation of the steel sheets and area can be reduced in a large way.

Therefore, high magnetic efficiency of the straight cores 1 can be maintained, because iron loss of the bent portions 12 forming the magnetic circuit does not increase even though the bent portions 12 are bent by bending process for forming the annular stator core and the magnetic properties does not deteriorate.

Further, accuracy of configuration, such as roundness, concentricity and coaxility between cores is enhanced, because the deformation of the bent portions 12 during the bending process can be reduced. Thus, the brushless DC motor can be prevented from increasing noise and vibration.

Figure 5:
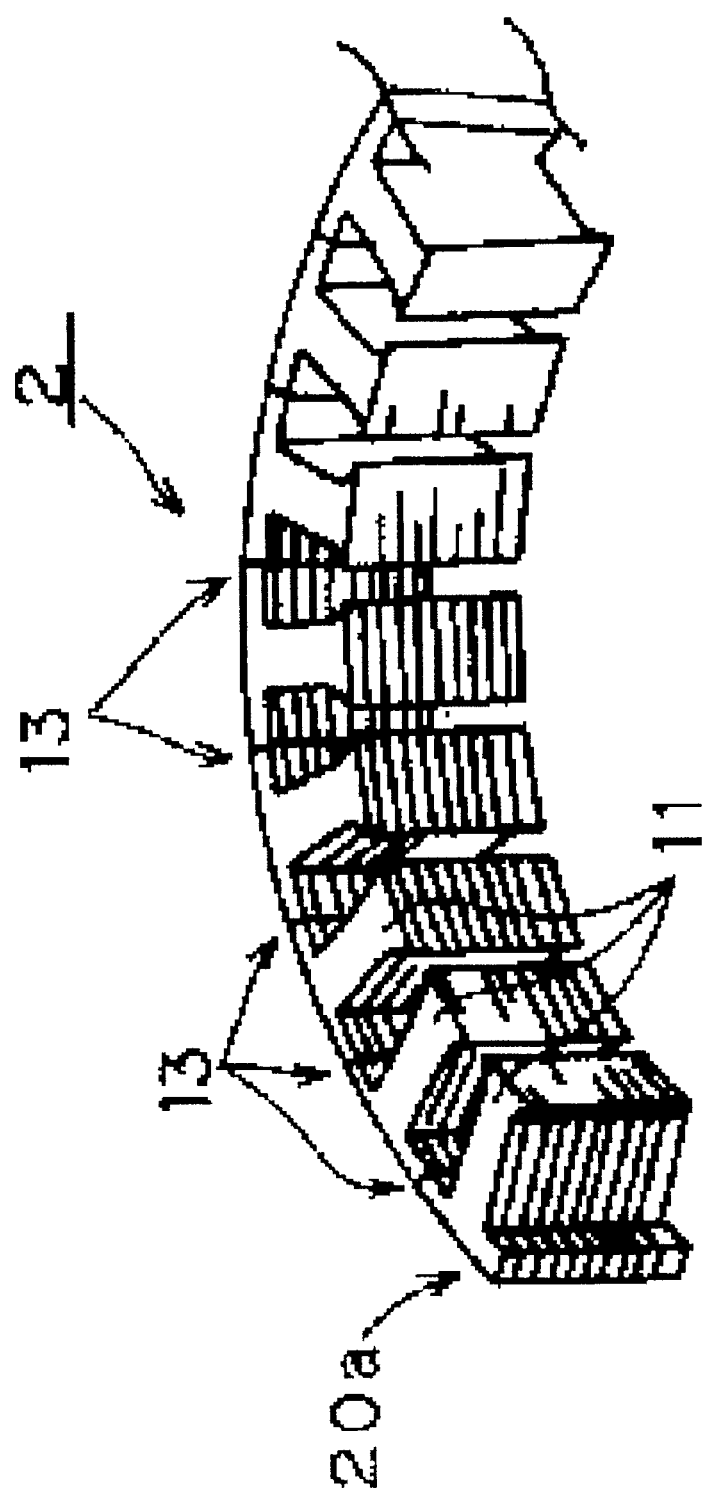
FIG. 5 is an oblique perspective view of a stator core in first embodiment of the present invention.

A stator core 2 of the first embodiment is made by following steps; first, laminating a plurality of straight core 1 in predetermined thickness and fixing them; as shown in FIG. 5, second, bending the bent portions 12 in a direction so as to close the opening of the V-shaped notches 13 to form in annular configuration, and; third, forming an annular laminated core by connecting the connecting portions 20a and 20b (not shown) formed on both end portions of the straight cores 1.

Figure 6:
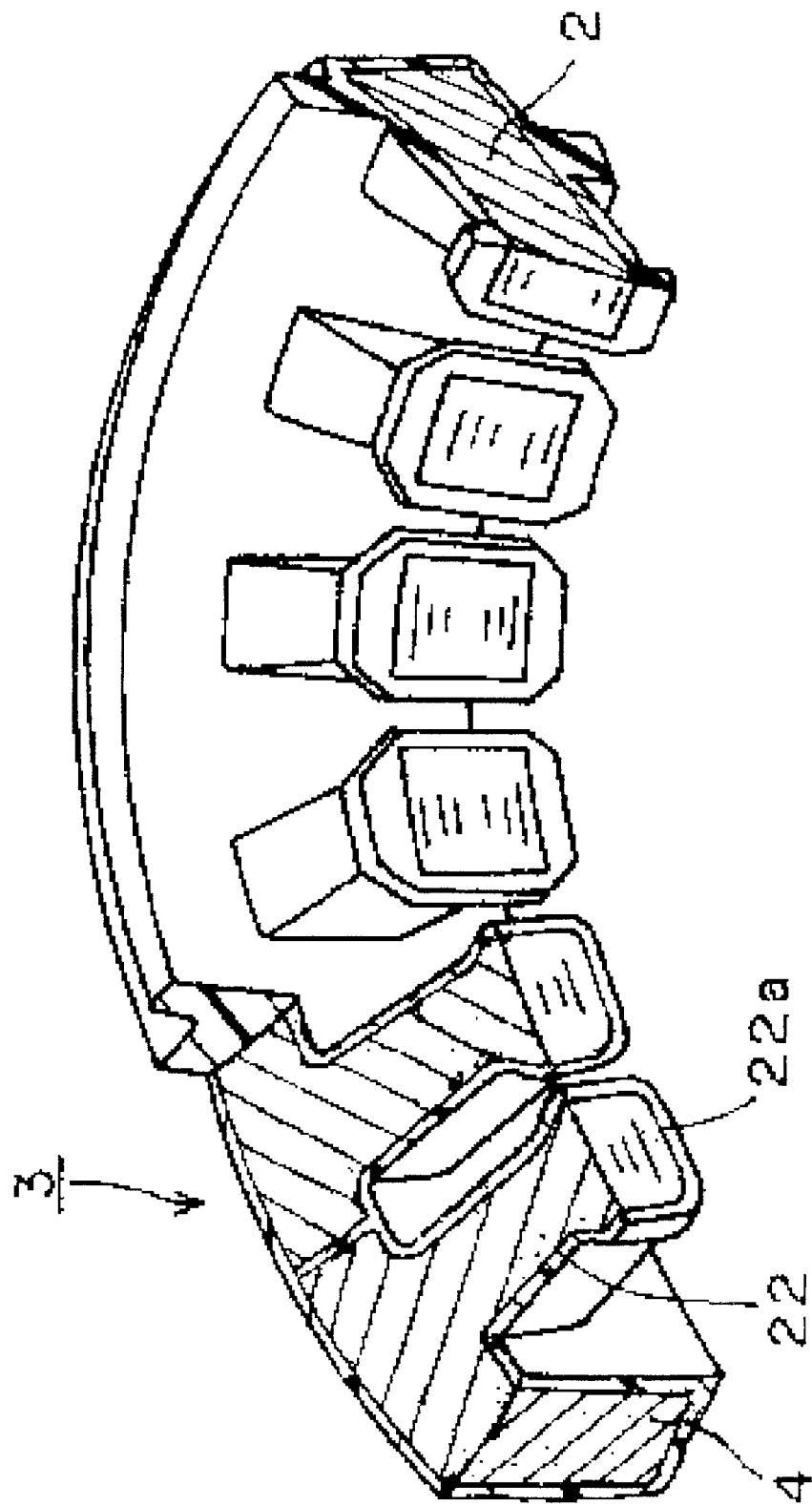
FIG. 6 is an enlarged fragmentary oblique perspective view schematically illustrating the configurational outline of the stator core in first embodiment of the present invention.
Figure 7:
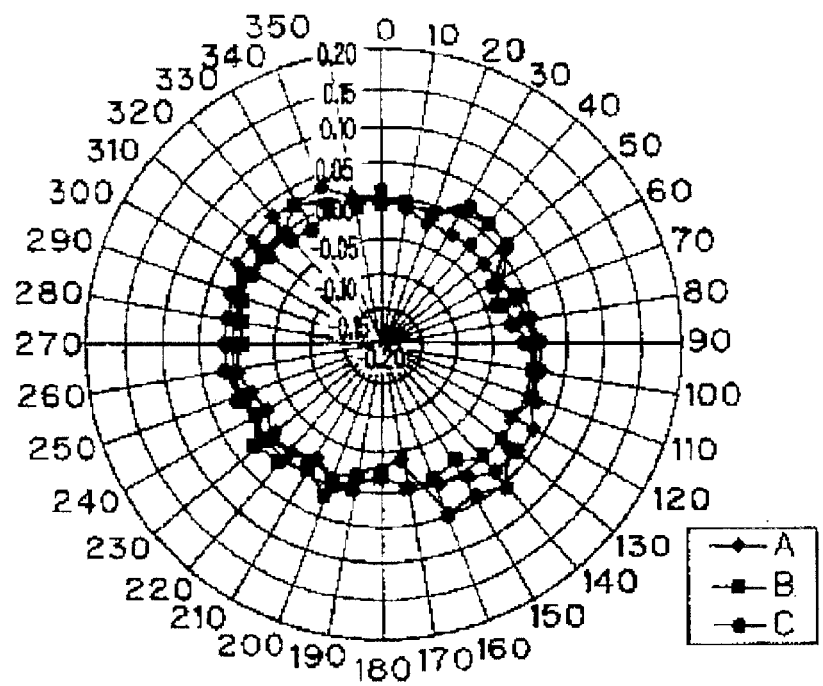
Figure 7:
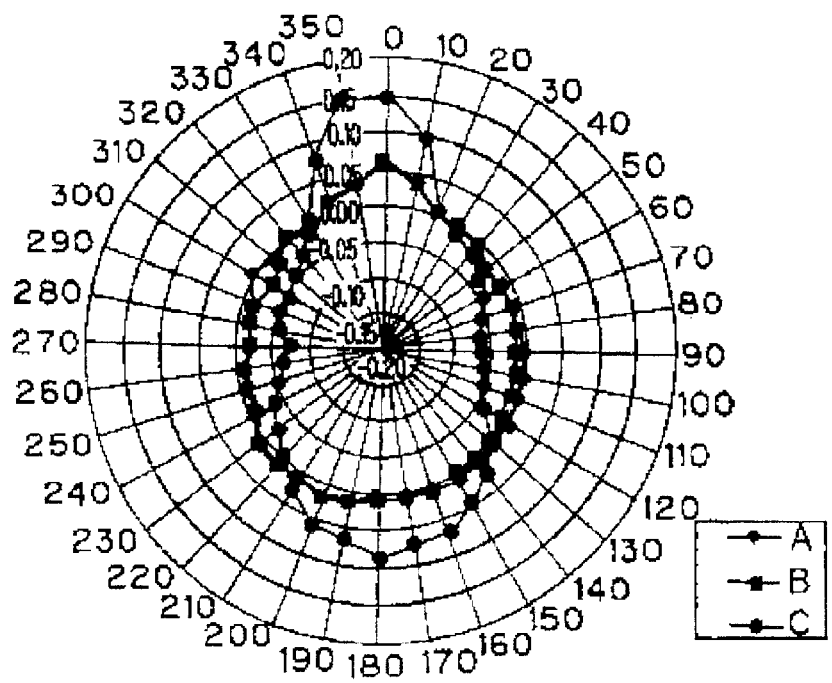

Moreover, following the above steps for manufacturing the stator core 2, resin material layer 4 is formed on the outer surface of the stator core 2 by insert molding process (not shown) using molten resin material injected in die assembly so as to form a stator core 3 having an insulating portion on the outer surface as shown in FIG. 6, provided that end surfaces 22a of laminated teeth portions 22 facing to a rotor within the brushless DC motor are not coated by resin material and directly exposed to air.

FIGS. 7(a) and 7(b) are circular charts showing roundness of stator core and FIG. 7(a) shows roundness of stator core of the present invention and FIG. 7(b) shows roundness of conventional stator core. FIGS. 7(a) and 7(b) show difference in dimension between design specification and actual value of radius of the stator core measured every 10 degree (10°) along an outer periphery thereof and indicated by a radar chart. Meanwhile, radius of the stator core is measured at three points in laminated direction and, in FIGS. 7(a) and 7(b), letter A (diamond shape) denotes measured value at a top portion of the stator core, letter B (square shape) denotes measured value at a central portion of the stator core and letter C (round shape) denoted measured value at a bottom portion of the stator core.

It should be clearly shown in FIGS. 7(a) and 7(b), the stator core of the present invention has excellent roundness because, as shown in FIG. 7(a), the stator core of the present invention has a radius substantially being corresponded with a design specification (on the point 0 circumference of the chart) mostly over all circumference thereof and a difference is within ±0.05 mm relative to the design specification, even if actual value of radius of the stator core deviates from the design specification. On the other hand, a radius of a conventional stator core varies widely relative to the design specification, in particular, a part of measured radius of the conventional stator core largely deviates (approximately ±1.5 mm) from design specification. Therefore, configuration of the outer periphery of the stator core becomes a distorted round shape, in turn, deteriorates the roundness and vibration and noise is generated.

After the coating of the resin material, coils are wound around each of teeth portions 22 of the stator core 3 and assembly process of a stator is finished and then the stator is incorporated in a brushless DC motor.

And the brushless DC motor having the stator and a magnetic material, such as a permanent magnet or the like, facing to the stator has excellent magnetic properties and high magnetic efficiency, can be realized low noise, low vibration and low production cost, thus the brushless DC motor can be used suitably for a fan or blower of an air conditioner as a small sized brushless DC motor.

Second Embodiment

Figure 8:
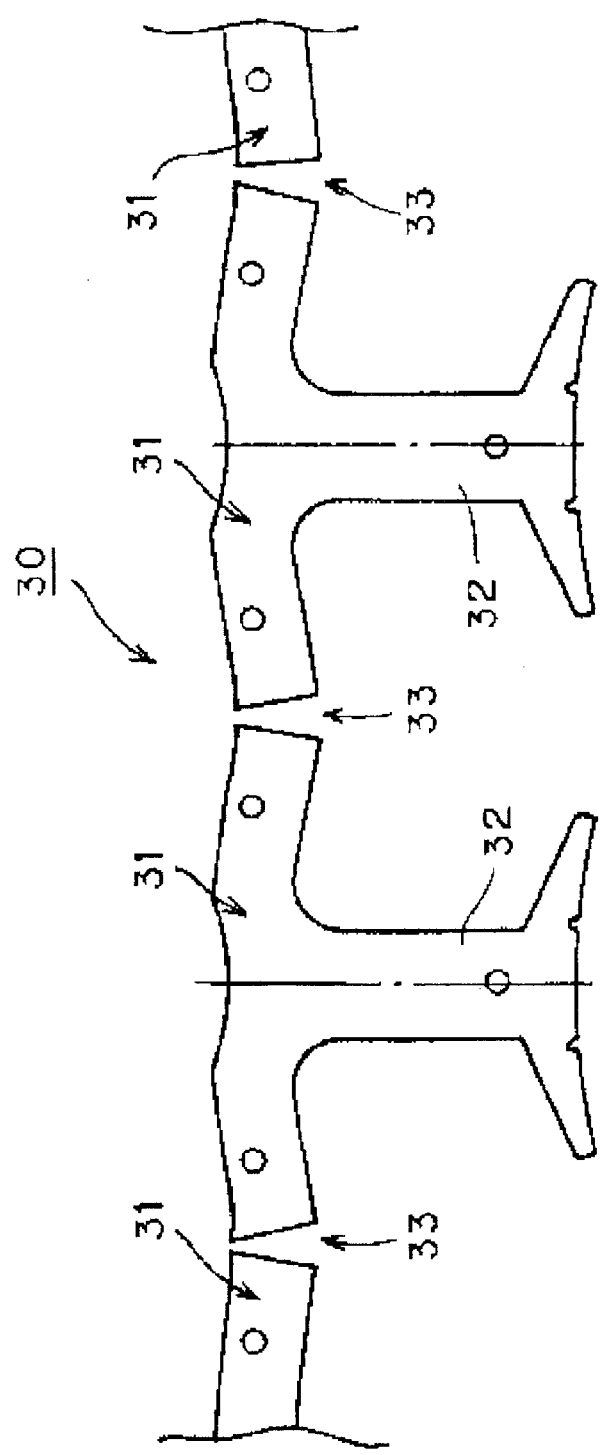
FIG. 8 is a plan view schematically illustrating the configurational outline of segment core elements in second embodiment of the present invention.

FIG. 8 shows a plan view of segment core elements 30 for forming a stator core of a second embodiment of the present invention. The segment core elements 30 are composed of plural independent segment cores 31 formed by cutting off each of teeth portions 32 at bent portions 33 and aligning the segment cores 31.

Figure 9:
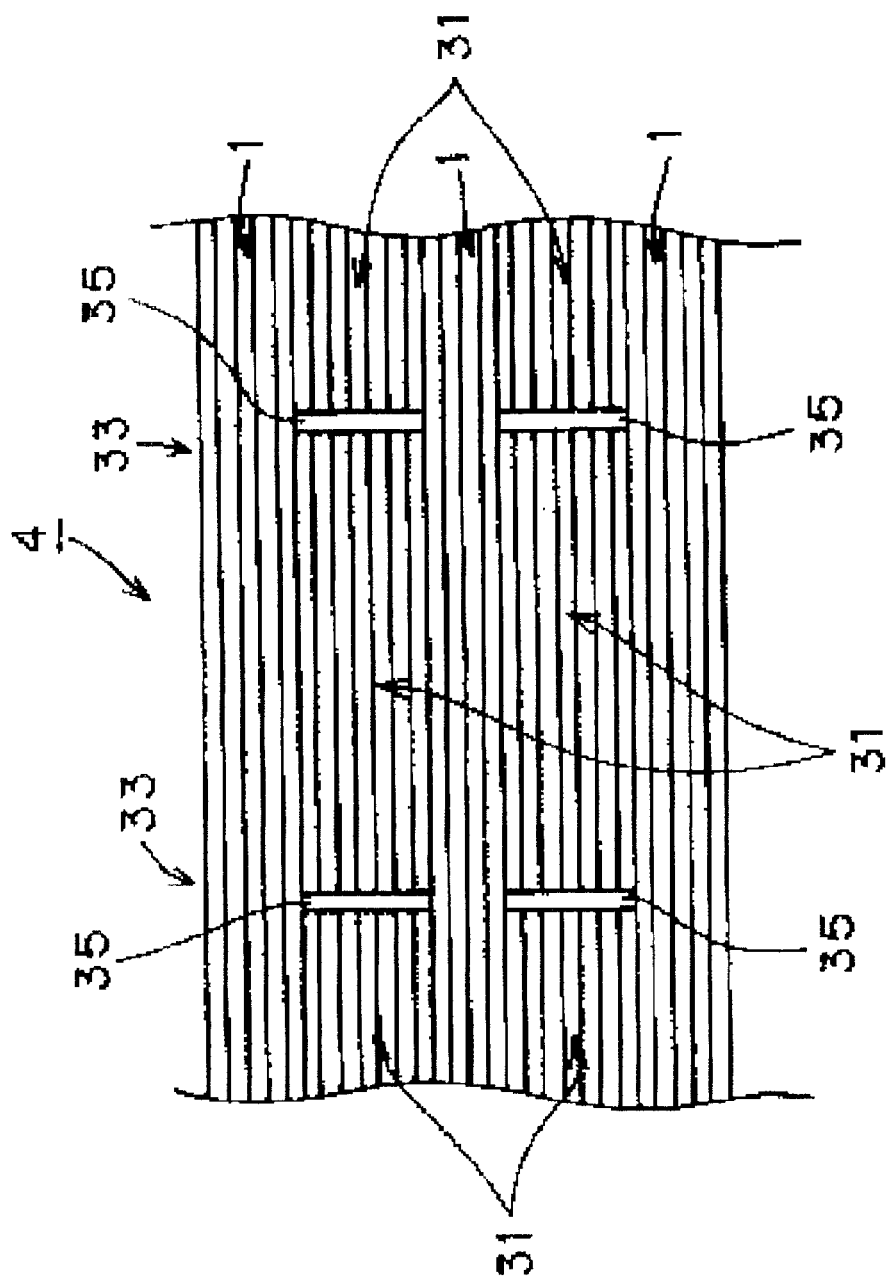
FIG. 9 is a side view schematically illustrating the configurational outline of laminated core in second embodiment of the present invention.
Figure 10:
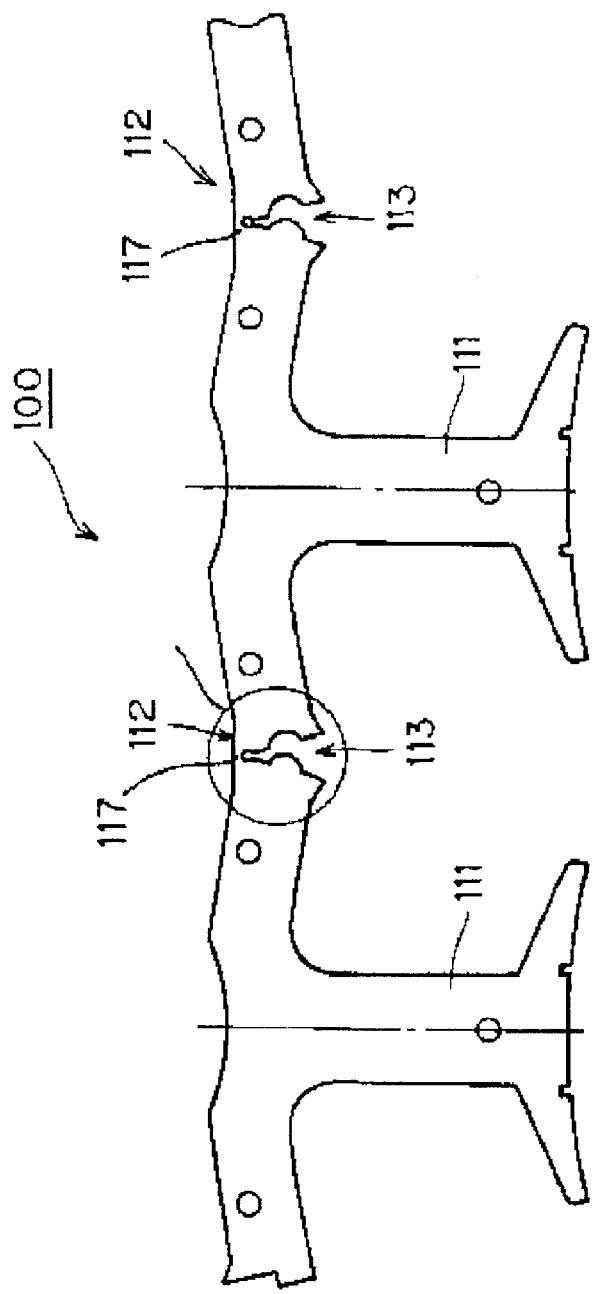
FIG. 10 is an enlarged fragmentary sectional view schematically illustrating the configurational outline of a conventional straight core.
Figure 11:
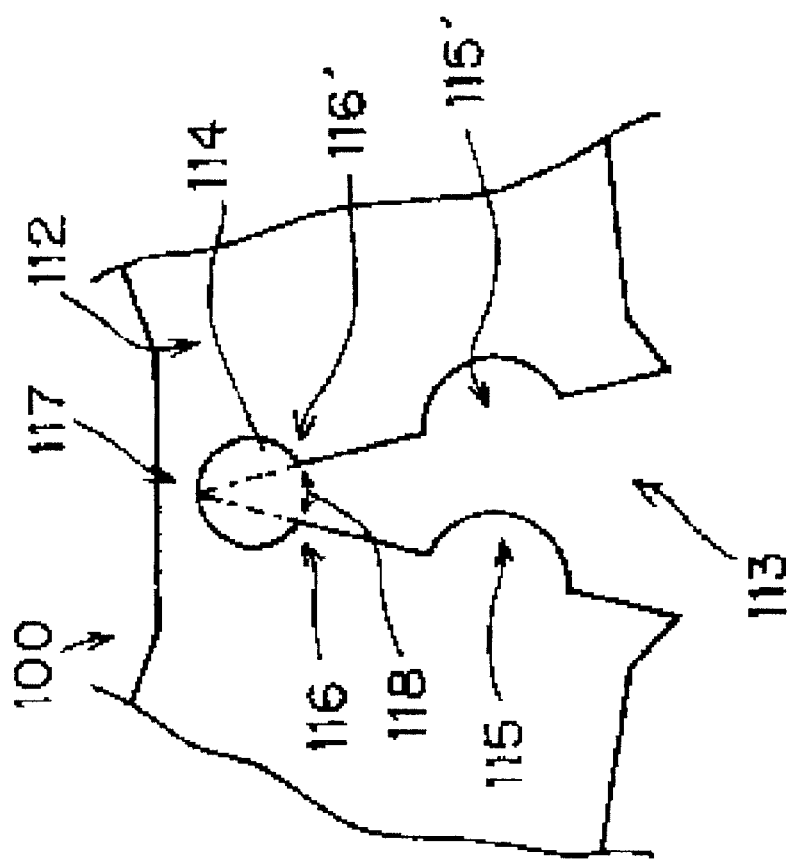
FIG. 11 is an enlarged fragmentary sectional view schematically illustrating the configurational outline of a conventional V-shaped notch.
Figure 12:
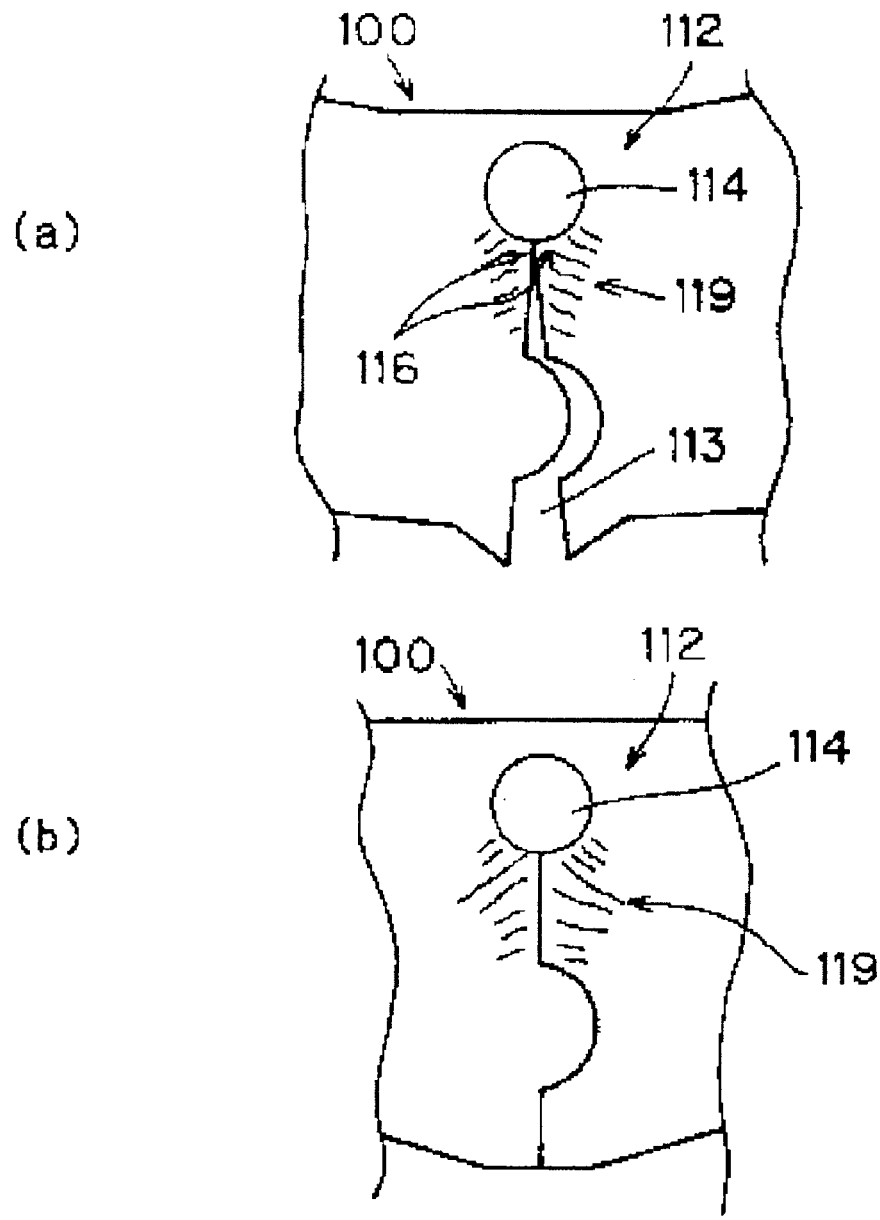
FIG. 12 an explanation view of the conventional V-shaped notch during bending process.

A laminated core 4 shown in FIG. 9 is formed by alternate lamination of the straight core 1 of the first embodiment and the segment core elements 30 so as to overlap the teeth portions 11 of the straight core 1 and the teeth portions 32 of the segment core elements 30. As shown in FIG. 9 depicting a side view of the laminated core 4, lengthwise slits 35 are formed between bounded segment cores 31 and 31 at the bent portions 33 of the laminated core 4 and thin portions and the slits 35 are alternatively disposed between the teeth portions of the laminated core 4.

In the second embodiment of the present invention, the slits 35 forms partial clearances and/or spaces between the core back portions and spring back force acting as reaction force of bending force is weakened by the clearances and/or spaces, therefore, although a stator core is formed by bending the straight core 1 so as to close opening of the V-shaped notches as described in the first embodiment, the slits 35 allows to facilitate the bending process of the bent portions 33. As the result, roundness of the stator core can be further improved and torque ripple and cogging torque of the brushless DC motor utilizing the stator including the stator core can be reduced and noise and vibration of the motor is minimized.

Meanwhile, although above mentioned laminated core 4 is formed by alternatively laminated predetermined number of the segment core elements 30 and the straight cores 1, the laminated core 4 may also be formed by alternatively laminated unspecified number of the segment core elements 30 and the straight cores 1 and thin portions and slits alternatively formed on bent portions of the laminated core irregularly disposed in perpendicular (lamination) direction.

Accordingly, although this invention has been shown and described with respect to exemplary embodiments thereof, it should be understood by those skilled in the art that the foregoing and various other changes, omissions, and additions in the form and detail thereof may be made therein without departing from the spirit and scope of the invention.

What is claimed is:

1. A stator core formed by laminated strip-shaped straight cores including a plurality of teeth portions comprising:

bent portions being provided with V-shaped notches, which define V-shaped gaps opened to one direction and interposing between each of the teeth portions, the straight cores being formed into an annular configuration by bending the bent portions in a direction so as to close the V-shaped notches;

circular holes being provided at the bent portions so as to form a series of gaps between each of the teeth portions; and deformation preventing portions being a part of the bent portions and including cutting-off parts of a pair of oblique portions defining the V-shaped notches toward the circular holes so as to expand the gaps of the V-shaped notches and circular holes for preventing the bent portions from deforming by stress.

2. A stator core comprising:

a plurality of independent segment cores, each segment core having a teeth portion;

strip-shaped straight cores including a plurality of teeth portions, bent portions being provided with V-shaped notches and interposing between each of the teeth portions of the strip-shaped straight cores, the strip-shaped straight cores being laminated in the thickness direction together with the segment cores;

wherein the laminated strip-shaped straight cores are bent at the bent portions in a direction so as to close the V-shaped notches to form an annular stator core.

3. A stator core according to claim 2, wherein, deformation preventing portions formed on the bent portions being a part of the bent portions and including cutting-off parts of a pair of oblique portions defining the V-shaped notches toward the circular holes so as to expand a gap formed within the V-shaped notches for preventing the bent portions from deforming by stress of bending process.

4. An electric motor comprising:

a stator; and a rotor including a magnetic material facing to the stator core in radial direction;

wherein the stator includes a stator core formed by strip-shaped straight cores having a plurality of teeth portions, bent portions being provided with V-shaped notches and interposing between each of the teeth portions and bending the bent portions in a direction so as to close the V-shaped notches to form annular stator core, circular holes being provided in the bent portions in a manner that the circular holes are continuously formed with tip portions of each of the V-shaped notches and deformation preventing portions formed on the bent portions being a part of the bent portions and including cutting-off parts of a pair of oblique portions, defining the V-shaped notches toward the circular holes so as to expand the gaps of the V-shaped notches and the circular holes for preventing the bent portions from deforming by stress of bending process.

5. An electric motor comprising:

a stator; and a rotor including a magnetic material facing to the stator core in radial direction;

wherein the stator includes a stator core formed by strip-shaped straight cores having a plurality of teeth portions, bent portions being provided with V-shaped notches and interposing between each of the teeth portions and bending the bent portions in a direction so as to close the V-shaped notches to form annular stator core, circular holes being provided in the bent portions in a manner that the circular holes are continuously formed with tip portions of each of the V-shaped notches and deformation preventing portions formed on the bent portions being a part of the bent portions and including cutting-off parts of a pair of oblique portions defining the V-shaped notches toward the circular holes so as to expand the gaps of the V-shaped notches and the circular holes for preventing the bent portions from deforming by stress of bending process; and wherein segment core elements having plural independent segment cores formed by cutting off each of teeth portions are alternatively laminated with the straight cores so as to form a plurality of slits within the stator cores.

* * * * *